United States Patent
Martin

(10) Patent No.: US 9,581,126 B2
(45) Date of Patent: Feb. 28, 2017

(54) ENGINE CONTROL FOR LIMITING CATALYST TEMPERATURE IN NORMAL AND ECONOMY MODES

(71) Applicant: Ford Global Technologies, LLC, Dearborn, MI (US)

(72) Inventor: Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 369 days.

(21) Appl. No.: 14/109,065

(22) Filed: Dec. 17, 2013

(65) Prior Publication Data
US 2015/0167624 A1  Jun. 18, 2015

(51) Int. Cl.

| F02P 5/15  | (2006.01) |
|---|---|
| F02P 5/152 | (2006.01) |
| F02D 41/02 | (2006.01) |
| F01N 11/00 | (2006.01) |
| F02D 41/14 | (2006.01) |
| F02D 41/24 | (2006.01) |
| F02D 37/02 | (2006.01) |
| F02N 11/04 | (2006.01) |
| F02D 35/02 | (2006.01) |

(52) U.S. Cl.
CPC ............ *F02P 5/152* (2013.01); *F01N 11/002* (2013.01); *F02D 37/02* (2013.01); *F02D 41/0235* (2013.01); *F02D 41/1401* (2013.01); *F02D 41/2422* (2013.01); *F02P 5/1502* (2013.01); *B60W 20/15* (2016.01); *B60W 2510/068* (2013.01); *B60W 2710/0622* (2013.01); *F01N 2430/00* (2013.01); *F01N 2900/08* (2013.01); *F01N 2900/1602* (2013.01); *F02D 35/027* (2013.01); *F02D 2041/0265* (2013.01); *F02D 2200/0802* (2013.01); *F02D 2200/602* (2013.01); *F02D 2200/604* (2013.01); *F02D 2200/606* (2013.01); *F02D 2250/26* (2013.01); *F02N 11/04* (2013.01); *Y02T 10/46* (2013.01); *Y02T 10/47* (2013.01)

(58) Field of Classification Search
CPC .... B60W 20/10; F02D 37/02; F02D 41/2422; F02D 41/1401; F02D 41/0235; F02D 2200/604; F02D 2200/606; F02D 2041/0265; F02D 2250/26; F02P 5/152; F02P 5/1502; F01N 11/002; F01N 2900/1602
USPC ...... 123/406.11, 406.12, 406.19; 701/22, 54, 701/104; 60/274, 285, 286
See application file for complete search history.

(56) References Cited

U.S. PATENT DOCUMENTS

| 6,330,796 B1 * | 12/2001 | Nishimura ............ F02D 41/024 123/295 |
|---|---|---|
| 6,345,499 B1 * | 2/2002 | Nishimura .............. F02D 37/02 123/295 |
| 7,155,901 B2 | 1/2007 | Michelini |

(Continued)

*Primary Examiner* — Joseph Dallo
(74) *Attorney, Agent, or Firm* — David Kelley; John D. Russell; B. Anna McCoy

(57) ABSTRACT

Systems and methods for operating an engine of a vehicle during high engine loads are presented. In one example, fuel may be conserved at higher driver demand torques by limiting engine torque when the engine is operated in an economy mode. Additionally, two accelerator pedal position based fuel enrichment schedules are provided for operating the engine in different operating modes.

19 Claims, 4 Drawing Sheets

(56) References Cited

U.S. PATENT DOCUMENTS

| | | | |
|---|---|---|---|
| 7,698,048 B2 | 4/2010 | Jung et al. | |
| 7,918,090 B2* | 4/2011 | Suzuki | F02B 37/18 |
| | | | 60/602 |
| 2005/0161018 A1* | 7/2005 | Tomita | F02D 37/02 |
| | | | 123/299 |
| 2005/0161020 A1* | 7/2005 | Tomita | F02D 37/02 |
| | | | 123/305 |
| 2005/0205049 A1* | 9/2005 | Lewis | F01L 13/0005 |
| | | | 123/198 DB |
| 2009/0007564 A1* | 1/2009 | Suzuki | F02B 37/18 |
| | | | 60/602 |
| 2009/0282810 A1 | 11/2009 | Leone et al. | |
| 2011/0011061 A1* | 1/2011 | Yamakawa | F02D 13/0234 |
| | | | 60/285 |
| 2011/0083426 A1* | 4/2011 | Ikemoto | F01N 3/043 |
| | | | 60/286 |
| 2014/0069380 A1* | 3/2014 | Leone | F02D 13/0242 |
| | | | 123/406.12 |
| 2015/0045185 A1* | 2/2015 | Doering | B60W 10/02 |
| | | | 477/181 |

\* cited by examiner

ENGINE CONTROL FOR LIMITING CATALYST TEMPERATURE IN NORMAL AND ECONOMY MODES

FIELD

The present description relates to a system and methods for limiting temperature of an internal combustion engine exhaust gas after treatment device. The systems and methods may be particularly useful for engines that may occasionally operate at higher engine speeds and loads.

BACKGROUND AND SUMMARY

An engine may be operated at higher engine speeds and loads from time to time. Operating the engine at higher loads may increase engine exhaust gas temperatures, and operating the engine at higher speeds may increase the exhaust gas mass flow rate. Consequently, the amount of thermal energy supplied to an engine exhaust system may increase at higher engine speeds and loads. For example, a temperature of an exhaust gas after treatment device, such as a catalyst, may increase as engine speed and load increase. Further, the exhaust gas after treatment device temperature may increase further when hydrocarbons discharged from the engine oxidize within the after treatment device.

One way to reduce engine exhaust gas temperature and catalyst temperature is to enrich the engine air-fuel ratio to a ratio that is rich of stoichiometry. However, enriching the engine air-fuel ratio may increase hydrocarbon and carbon monoxide emissions from the engine. Further, engine fuel consumption may increase beyond what a driver may expect given the driver's torque input request.

The inventor herein has recognized the above-mentioned disadvantages and have developed a method for operating an engine, comprising: advancing spark timing from a borderline (BDL) spark timing toward minimum spark advance for best torque (MBT) and enriching an engine air-fuel ratio in response to a catalyst temperature greater than a threshold temperature.

By advancing spark timing toward MBT timing in response to catalyst temperature, it may be possible to provide the technical result of reducing engine thermal output without increasing engine emissions and fuel consumption. For example, engine torque may be limited or constrained to a torque where MBT spark timing occurs without encountering engine knocking in response to catalyst temperature. Thus, an engine that was operating at borderline spark timing before a catalyst temperature threshold was exceeded, may be operated with advanced engine spark timing and at a lower torque in response to catalyst temperature greater than a threshold temperature. In this way, catalyst temperature may be limited or reduced without increasing engine fuel consumption.

The present description may provide several advantages. Specifically, the approach may reduce engine fuel consumption. Additionally, the approach may reduce the possibility of catalyst degradation. Further still, the approach may improve vehicle drivability at higher engine loads.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to controlling temperature of an exhaust after treatment device at higher driver demand torque levels. The exhaust after treatment device may process exhaust emissions for an engine of the type shown in FIG. 1. The engine may operate as shown in the sequence illustrated in FIG. 2. Fuel supplied to the engine may be a function of accelerator pedal position as shown by the function illustrated in FIG. 3. The method of FIG. 4 may operate the engine of FIG. 1 as shown in the operating sequence of FIG. 2 while utilizing a function similar to the function shown in FIG. 3.

Figure 1:
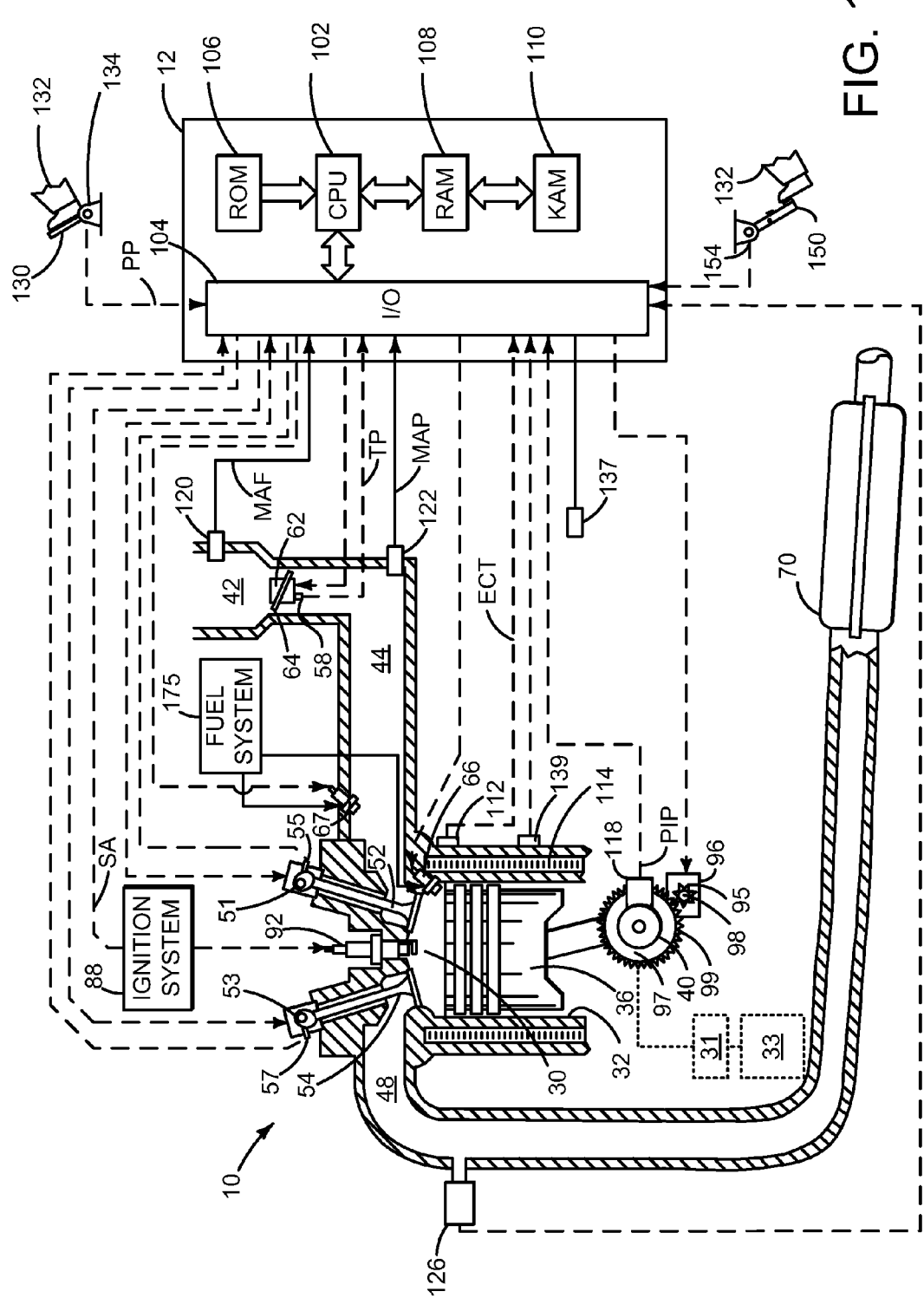
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Electrical connections between controller 12 and the various sensors and actuators are indicated by dashed lines.

Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system 175 that includes a fuel tank and fuel pump (not shown). In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when driver 132 applies brake pedal 150; a measurement of ambient temperature via temperature sensor 137; a knock sensor 139; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, engine 10 may be mechanically coupled to electric motor 33 via transmission 31. Alternatively, electric motor 33 may be directly coupled to engine 10 in a integrated starter/generator configuration.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
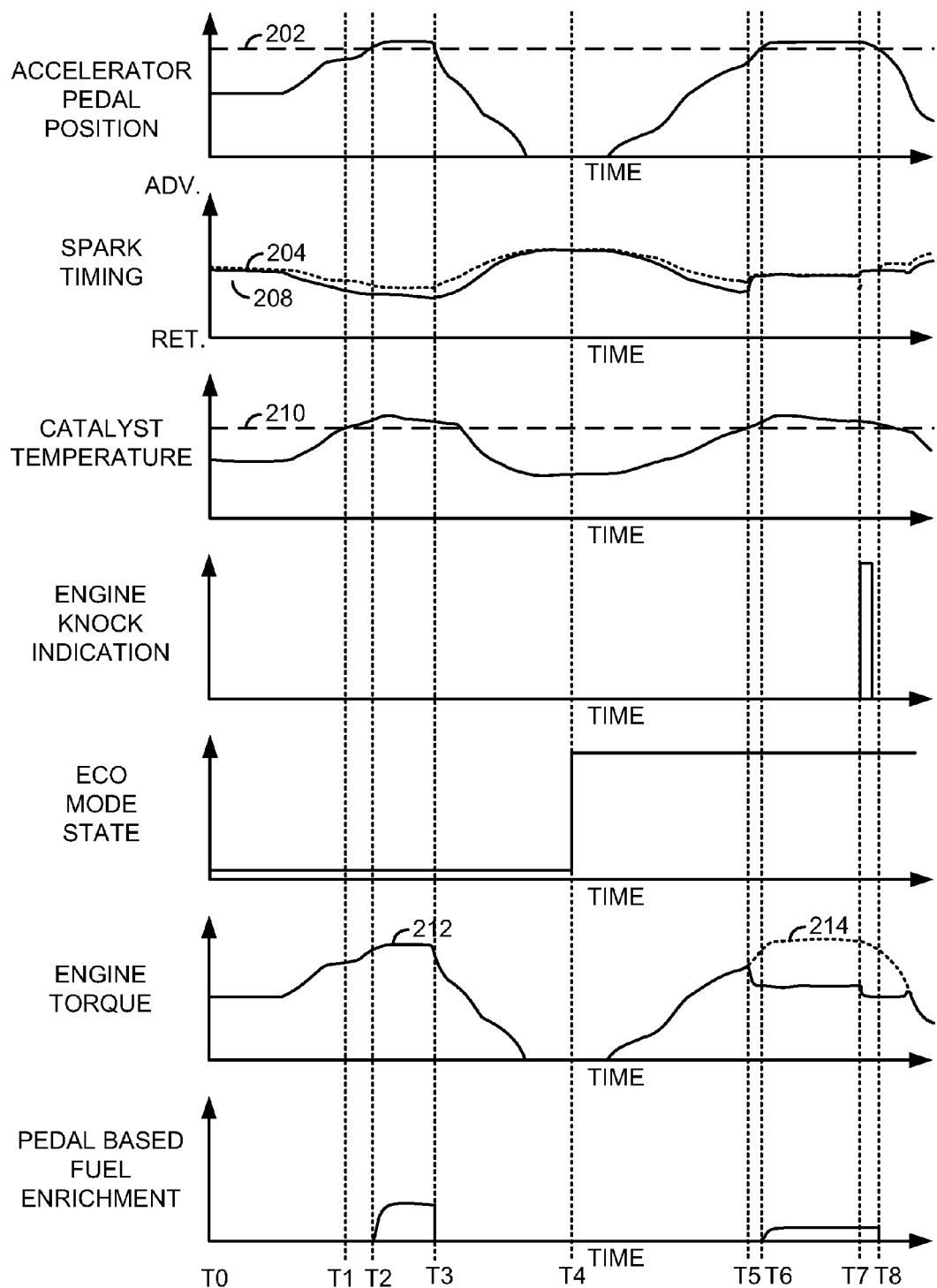
FIG. 2 shows an example engine operating sequence.
Figure 4:
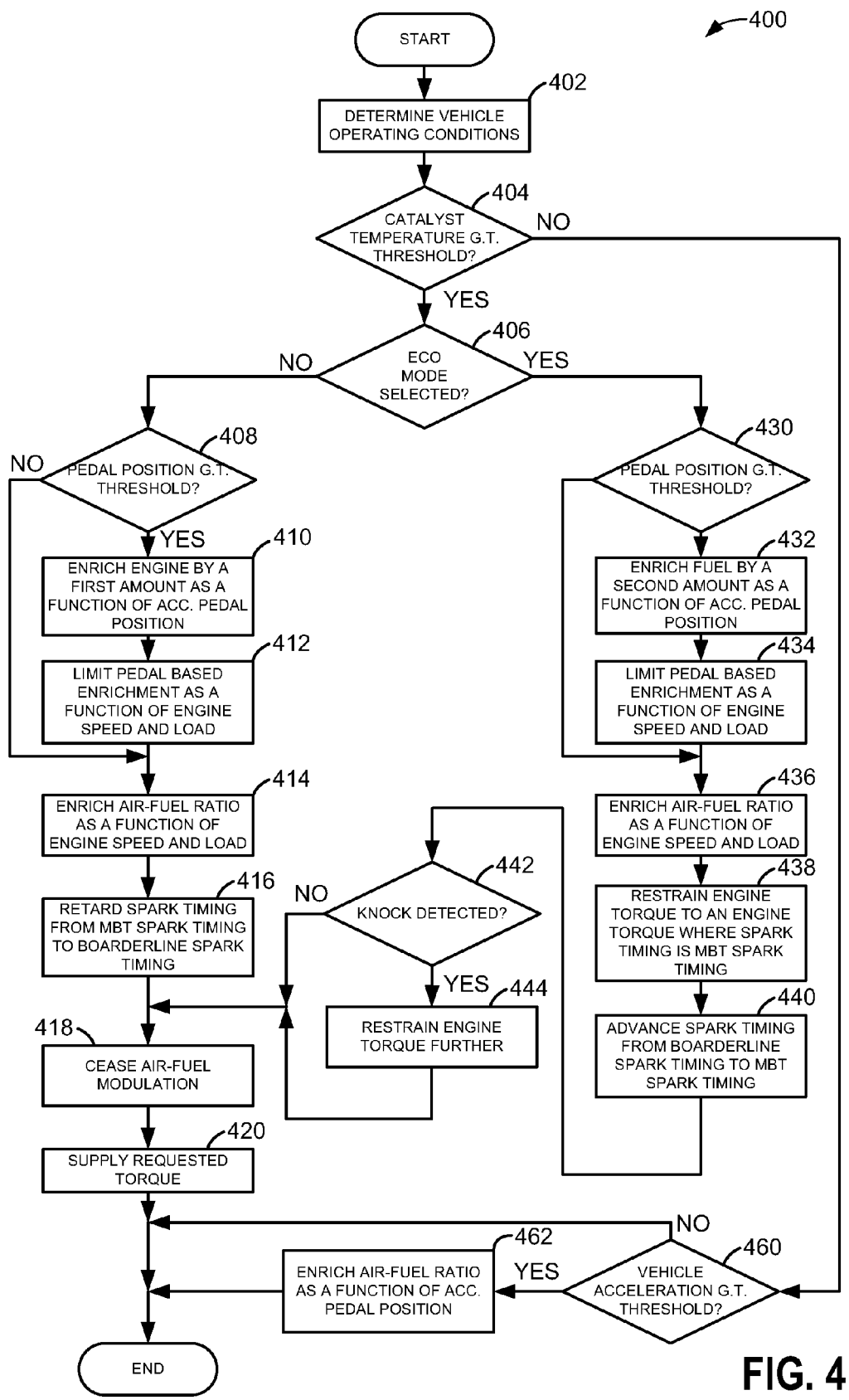
FIG. 4 shows an example method for operating an engine.

Referring now to FIG. 2, an example engine operating sequence according to the method of FIG. 4 is shown. The operating sequence of FIG. 2 may be performed by the system shown in FIG. 1. Vertical markers T0-T8 represent times of interest during the sequence.

The first plot from the top of FIG. 2 is a plot of accelerator pedal position versus time. The X axis represents time and time increases from the right side of FIG. 2 to the left side of FIG. 3. The Y axis represents accelerator pedal position and the accelerator pedal position increases (e.g., is applied further) in the direction of the Y axis arrow.

The second plot from the top of FIG. 2 is a plot of engine spark timing versus time. The X axis represents time and time increases from the right side of FIG. 2 to the left side of FIG. 3. The Y axis represents engine spark timing and engine spark timing advance increases in the direction of the Y axis arrow. The dashed line 204 represents MBT spark timing for the present engine speed and load at the illustrated time. The solid line 208 represents borderline (BDL) spark timing (e.g., spark timing where no engine knock or trace engine knock may be observed at the present engine speed and load). MBT spark timing and BDL spark timing are equivalent when only solid line 208 is visible.

The third plot from the top of FIG. 2 is a plot of catalyst temperature versus time. The X axis represents time and time increases from the right side of FIG. 2 to the left side of FIG. 3. The Y axis represents catalyst temperature and catalyst temperature increases in the direction of the Y axis arrow. Dashed line 210 represents a threshold temperature at which actions may be taken to limit or reduce catalyst temperature.

The fourth plot from the top of FIG. 2 is a plot of engine knock versus time. The X axis represents time and time increases from the right side of FIG. 2 to the left side of FIG. 3. The Y axis represents engine knock and engine knock is indicated when the engine knock trace or line is at a higher level.

The fifth plot from the top of FIG. 2 is a plot of economy mode state versus time. The X axis represents time and time increases from the right side of FIG. 2 to the left side of FIG. 3. The Y axis represents economy mode state and the engine and/or vehicle are in an economy mode when the economy mode state is at a higher level. The engine and/or vehicle are not in an economy mode when the economy mode state is at a lower level.

The sixth plot from the top of FIG. 2 is a plot of engine torque versus time. The X axis represents time and time increases from the right side of FIG. 2 to the left side of FIG. 3. The Y axis represents engine torque and engine torque increases in the direction of the Y axis arrow. Solid line 212 represents actual engine torque and dashed line 214 represents driver demand engine torque. The driver demand engine torque and actual engine torque are the same value when only solid line 212 is visible. If the vehicle in which the engine operates is a hybrid vehicle, an electric motor supplied power via a battery adds torque to the driveline when engine torque is reduced during catalyst protection to conserve fuel. For example, the electric motor supplies torque to the vehicle driveline when actual engine torque 212 is less than driver demand torque 214 during catalyst heat protection mode.

The seventh plot from the top of FIG. 2 is a plot of accelerator pedal based fuel enrichment versus time. The X axis represents time and time increases from the right side of FIG. 2 to the left side of FIG. 3. The Y axis represents fuel enrichment to the engine air-fuel ratio. The amount of fuel enrichment increases in the direction of the Y axis arrow.

At time T0, the accelerator pedal is at a middle position and engine torque follows the accelerator position to provide a middle level engine torque. The engine MBT spark timing is roughly equal to borderline spark timing and both spark timings are advanced to a middle level. The catalyst temperature is at a middle level, the engine is not knocking, and the engine is not operating in an economy mode. Further, no accelerator pedal based fuel enrichment is provided.

Between time T0 and time T1, the accelerator pedal is applied further and increased. MBT spark timing slightly retards and BDL spark timing retards more as engine speed and load increase (not shown) with the increasing accelerator pedal position. The catalyst temperature also increases, but there is no engine knock or accelerator pedal based fuel enrichment. The engine remains out of economy mode.

At time T1, catalyst temperature exceeds threshold temperature 210 in response to increasing engine speed and load (not shown). The accelerator pedal position is less than threshold level 202 and MBT and BDL spark timing are retarded from spark timing at time T0. Engine knock is not indicated and the engine is not in economy mode. The engine torque increases as the accelerator pedal position increases. Accelerator pedal based fuel enrichment is not activated, but fuel enrichment based on engine speed and load may be provided to cool exhaust flow since catalyst temperature is greater than threshold temperature 210.

At time T2, the accelerator pedal position has increased to a level greater than threshold 202 (e.g., ninety percent of fuel scale accelerator pedal movement). Catalyst temperature remains above threshold level 210 and the engine is not knocking. The engine is not in economy mode and engine torque continues to increase as accelerator pedal position increases. The accelerator pedal based fuel enrichment is activated and the engine air-fuel ratio is richened as indicated by the accelerator pedal enrichment increasing. The engine air-fuel ratio may be richened in proportion to the accelerator pedal position greater than threshold 202. Alternatively, the engine air-fuel ratio may be ramped to a richened value based on time since accelerator pedal position exceeded threshold level 202. By enriching the engine air-fuel ratio, engine exhaust gases and the catalyst temperature may be reduced as is shown shortly after time T2. The engine torque continues to increase with increasing accelerator pedal position. The MBT and BDL spark timings are retarded from their timings at time T1.

At time T3, the accelerator pedal position decreases in response to a driver releasing the accelerator pedal. The MBT and BDL spark timings advance and converge as engine speed and load decrease and the catalyst temperature begins to decrease further shortly after time T3. Engine knock is not indicated and the engine is not in economy mode. The engine torque decreases as the accelerator pedal position is reduced. The accelerator pedal based fuel enrichment is deactivated and the engine air-fuel ratio is leaned in response to the accelerator pedal position.

Between time T3 and time T4, the accelerator pedal position and engine torque continue to decrease. The engine is not in economy mode and catalyst temperature decreases as engine speed and load decrease (not shown).

At time T4, the engine is switched to economy mode. The engine may be switched to economy mode by the driver via a switch, or alternatively, a controller may switch the engine to economy mode when fuel stored in a fuel tank is less than a threshold level. Shortly after time T4, the driver increases the accelerator pedal position and catalyst temperature begins to increase. MBT spark timing advances more than BDL spark timing as engine speed and load increase.

At time T5, catalyst temperature exceeds threshold catalyst temperature 210. Engine torque is reduced to an engine torque where MBT spark timing may be provided without an indication of engine knock in response to the catalyst temperature and the engine being in economy mode. Thus, the engine torque is constrained or reduced to a level less than the driver demand torque, which is based on accelerator pedal position. Spark timing is advanced to MBT spark timing and the engine air-fuel ratio may be richened based on engine speed, engine load, and the elevated catalyst temperature. The engine is not knocking and accelerator pedal based fuel enrichment is not activated.

At time T6, the accelerator pedal position exceeds level 202. Consequently, accelerator pedal based fuel enrichment is activated to richen the engine air-fuel ratio; however, the accelerator pedal based fuel enrichment is provided in a lesser amount than the fuel enrichment at time T2 since the engine is in economy mode. By reducing the fuel enrichment, it may be possible to conserve fuel and reduce engine emissions. Further, operating the engine at MBT spark timing may allow the engine to extract additional energy per unit mass of fuel. The engine is operated at MBT spark timing and engine knock is not present.

At time T7, engine knock is sensed. The engine may begin to knock after engine temperature increases, ambient temperature increases, ambient humidity decreases, or fuel octane is reduced. The engine torque is reduced further in response to engine knock and the engine continues to operate at MBT spark timing. The engine is operating in economy mode, the catalyst temperature is decreasing, and accelerator pedal based fuel enrichment is active.

At time T8, the driver releases the accelerator pedal and engine torque is reduced with the decreased accelerator pedal position. Additionally, the accelerator pedal based fuel enrichment is ceased and the engine torque is no longer restrained to a value less than the driver demanded engine torque. Engine knock has stopped and the engine spark timing is transitioned to borderline spark timing.

In this way, the engine may be operated in or out of an economy mode where fuel enrichment is limited to a lesser value than when not operating in economy mode. Further, the engine torque is limited in economy mode when catalyst temperature is greater than a threshold temperature so that the engine spark timing may be advanced to reduce exhaust gas heat, thereby reducing catalyst temperature. Further still, by limiting engine torque, the mass flow rate of exhaust gas to the catalyst may be reduced to further reduce catalyst temperature.

Figure 3:
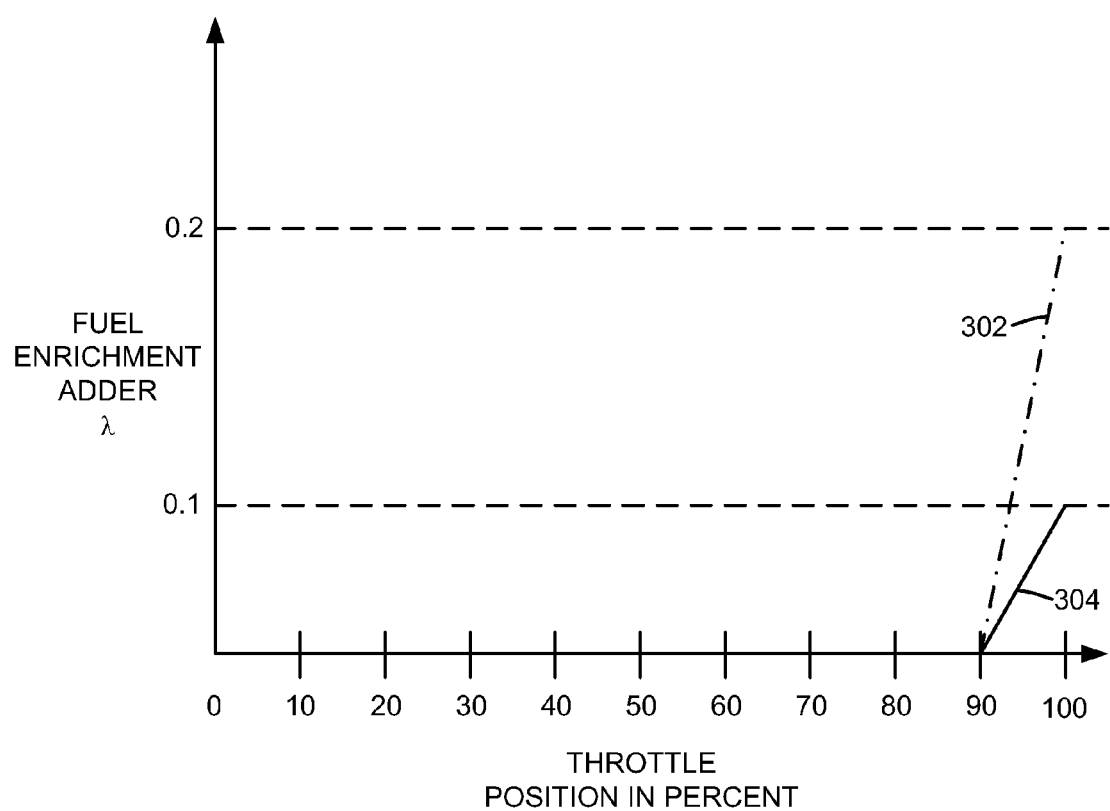
FIG. 3 shows an example accelerator pedal based engine air-fuel enrichment function.

Referring now to FIG. 3 an example plot of a function describing economy and non-economy accelerator pedal fuel enrichment is shown. The function described in FIG. 3 may be used in the method of FIG. 4 and in the system of FIG. 1.

The plot has an X axis that represents accelerator pedal position expressed as a percentage of full scale accelerator pedal position. For example, if accelerator pedal position is forty percent, the accelerator pedal is applied to forty percent of full accelerator pedal position.

The plot also has a Y axis that represents fuel enrichment in units of lambda. Lambda is defined as engine air-fuel ratio divided by the stoichiometric air-fuel ratio. Thus, a lambda value of one is an engine air-fuel ratio that is the stoichiometric air-fuel ratio. A lambda adder of 0.1 enriches the engine air-fuel mixture by ten percent.

Dash dot line 302 represents the accelerator pedal enrichment when the engine is not operated in the economy mode. Dashed line 304 represents the accelerator pedal enrichment when the engine is operated in the economy mode. Both line 302 and line 304 provide zero fuel enrichment until the accelerator pedal reaches ninety percent of full displacement application. The accelerator pedal enrichment increases from a value of zero to a value of 0.2 for the case when the engine is not operating in an economy mode. Accelerator pedal enrichment increases from a value of zero to a value of 0.1 for the case when the engine is operating in an economy mode. Thus, economy mode conserves ten percent of fuel enrichment in this example. In some examples, accelerator pedal based enrichment during economy mode may be stored in a table separate from accelerator pedal based enrichment when the engine is not operated in fuel enrichment mode. Further, the values shown in FIG. 3 are only representative and are not intended to limit the scope or breadth of the application.

Referring now to FIG. 4, an example method for operating an engine and reducing catalyst temperature is shown. The method of FIG. 4 may be incorporated into the system of FIG. 1 to provide the operating sequence of FIG. 3. Method 400 may be stored in non-transitory memory as executable instructions.

At 402, method 400 determines operating conditions. Operating conditions may include but are not limited to engine speed, engine load (e.g., engine air amount divided by theoretical engine air amount), engine spark timing, catalyst temperature, vehicle speed, and economy/non-economy modes. Operating conditions may be inferred, estimated, or measured. Method 400 proceeds to 404 after operating conditions are determined.

At 404, method 400 judges whether or not a temperature of a catalyst located in the vehicle's exhaust system is greater than a threshold catalyst temperature. The catalyst temperature may be measured or inferred. If method 400 judges that the catalyst temperature is greater than (G.T.) the threshold temperature, the answer is yes and method 400 proceeds to 406. Otherwise, the answer is no and method 400 proceeds to 460.

At 460, method 400 judges whether or not the vehicle is accelerating at a rate greater than a threshold rate. The threshold rate may vary with a gear of a transmission that is engaged. For example, if a transmission coupled to the engine is in first gear, the acceleration threshold may be a first acceleration threshold. If the transmission is in a second gear, the acceleration threshold may be a second acceleration threshold, the second acceleration threshold less than the first acceleration threshold. If method 400 judges that the vehicle is accelerating at greater than a threshold acceleration rate, the answer is yes and method 400 proceeds to 462. Otherwise, the answer is no and method 400 proceeds to exit.

At 462, method 400 enriches the engine air-fuel ratio as a function of accelerator pedal position. The engine air-fuel ratio may increase proportionately with an increase in accelerator pedal position. Alternatively, engine air-fuel ratio may be enriched by ramping engine air-fuel ratio to a richer mixture based on time since a threshold accelerator pedal position is reached. The fuel enrichment amount may vary with selected transmission gear and/or as a function of engine speed and load. By enriching the air-fuel mixture at higher rates of acceleration, it may be possible to reduce a driver's perception of engine torque variation that may result from switching between air-fuel ratios to stimulate catalyst efficiency. Method 400 proceeds to exit after engine air-fuel is enriched.

At 406, method 400 judges whether or not the engine is in an economy mode. The engine may enter an economy mode when economy mode is manually selected by a driver. Alternatively, the engine may enter economy mode automatically (e.g., without being selected by a driver) in response to a level of fuel stored in a fuel tank being less than a threshold amount. If method 400 judges that the engine is operating in an economy mode, the answer is yes and method 400 proceeds to 430. Otherwise, the answer is no and method 400 proceeds to 408.

At 408, method 400 judges whether or not an accelerator pedal position is greater than a threshold position. In one example, the accelerator pedal position may be determined from an accelerator pedal sensor. If method 400 judges that the accelerator pedal position is greater than a threshold position (e.g., ninety percent of full scale), the answer is yes and method 400 proceeds to 410. Otherwise, the answer is no and method 400 proceeds to 414.

At 410, method 400 enriches an engine air-fuel ratio by a first amount as a function of accelerator pedal position. In one example, the engine air-fuel ratio is richened in proportion to an increase in accelerator pedal position. In another example, engine air-fuel ratio is richened to a predetermined amount based on an amount of time since the accelerator pedal position exceeded the threshold position. The amount of accelerator pedal enrichment is greater when the engine is not operating in an economy mode. Method 400 proceeds to 412 after the engine air-fuel ratio is enriched.

At 412, method 400 limits accelerator based engine air-fuel enrichment in response to engine speed and load. In one example, method 400 limits the accelerator based engine air-fuel ratio when an engine speed and an engine load are exceeded while vehicle speed is limited to less than a threshold vehicle speed. Method 400 proceeds to 414 after accelerator pedal based engine air-fuel enrichment is limited.

At 414, method 400 enriches the engine air-fuel ratio as a function of engine speed and load. In one example, the amount of air-fuel enrichment increases with engine speed and load when the catalyst threshold temperature is exceeded by the catalyst. Method 400 proceeds to 416 after engine air-fuel ratio is enriched.

At 416, method 400 retards spark timing from MBT spark timing to borderline spark timing. Borderline spark timing may be empirically determined and stored in controller memory. By operating the engine at borderline spark timing, it may be possible to reduce the possibility of engine knock. Method 400 proceeds to 418 after engine spark timing is adjusted.

At 418, method 400 ceases modulating the engine air-fuel ratio. By ceasing air-fuel modulation, it may be possible to reduce engine torque disturbances that may be noticeable to a driver. Method 400 proceeds to 420 after air-fuel modulation is ceased.

At 420, method 400 supplies the requested driver demand torque. The driver demand torque may be determined from accelerator pedal position and vehicle speed. In one example, engine throttle position and cam positions are adjusted to supply an engine air amount that when combined with fuel and combusted, provides the desired driver demand torque. Additionally, if the engine is operating in fuel economy mode and engine torque is restricted, electric motor torque may be increased to provide the difference between driver demand torque and engine torque. Method 400 proceeds to exit after the requested driver demand torque is provided.

At 430, method 400 judges whether or not an accelerator pedal position is greater than a threshold position. If method 400 judges that the accelerator pedal position is greater than a threshold position (e.g., ninety percent of full scale), the answer is yes and method 400 proceeds to 432. Otherwise, the answer is no and method 400 proceeds to 436.

At 432, method 400 enriches an engine air-fuel ratio by a second amount, less than the first amount, as a function of accelerator pedal position. In one example, the engine air-fuel ratio is richened in proportion to an increase in accelerator pedal position. In another example, engine air-fuel ratio is richened to a predetermined amount based on an amount of time since the accelerator pedal position exceeded the threshold position. The amount of accelerator pedal enrichment is greater when the engine is not operating in an economy mode. Method 400 proceeds to 434 after the engine air-fuel ratio is enriched.

At 434, method 400 limits accelerator based engine air-fuel enrichment in response to engine speed and load. For example, method 400 limits the accelerator based engine air-fuel ratio when an engine speed and an engine load are exceeded while vehicle speed is limited to less than a threshold vehicle speed. Method 400 proceeds to 436 after accelerator pedal based engine air-fuel enrichment is limited.

At 436, method 400 enriches the engine air-fuel ratio as a function of engine speed and load. In one example, the amount of air-fuel enrichment increases with engine speed and load when the catalyst threshold temperature is exceeded by the catalyst. Method 400 proceeds to 438 after engine air-fuel ratio is enriched.

At 438, method 400 restrains or limits engine torque to an engine torque where engine spark timing it MBT spark timing. In one example, engine operating conditions (e.g., engine torque and speed) where the engine operates at MBT spark timing without engine knock are empirically determined and stored in controller memory. Method 400 selects an engine torque and speed that is closest to the present engine speed and torque and limits the engine torque to the engine torque provided when the engine operates with MBT spark timing. In another example, method 400 includes reducing engine torque to a torque where borderline spark timing is within a predetermined number of crankshaft degrees of minimum spark advance for best torque (e.g., four crankshaft degrees) so that engine torque may not be reduced to an undesirable level.

In some examples, method 400 may also selects a transmission gear based on vehicle speed to achieve the engine torque that the engine provides at MBT spark timing. Method 400 may limit engine torque via limiting the engine air amount via the throttle and/or intake valve timing. Method 400 proceeds to 440 after the engine torque amount is limited.

At 440, method 400 advances spark timing to MBT spark timing as engine torque is limited to an engine torque provided when the engine operates at MBT spark timing without the presence of engine knock. MBT spark timing may be empirically determined and stored in controller memory. Engine spark timing is often at BLD timing to avoid engine knock and advanced to MBT timing at 440. Method 400 proceeds to 442 after engine spark timing is advanced from BLD spark timing in response to reduced engine load.

At 442, method 400 judges whether or not engine knock is present. In one example, the presence or absence of engine knock may be determined from output of a knock sensor. If the engine knock sensor indicates the presence of engine knock, the answer is yes and method 400 proceeds to 444. Otherwise, the answer is no and method 400 proceeds to 418.

At 444, method 400 further limits or restrains engine torque to reduce the possibility of engine knock while reducing the amount of heat energy directed to the engine exhaust catalyst. Engine spark timing is maintained at MBT spark timing and engine torque is reduced to a lesser value where engine knock is not expected. Method 400 proceeds to 418 after engine torque is further restrained to a lower torque where spark timing is at MBT spark timing when the lower torque is provided by the engine.

Thus, the method of FIG. 4 provides for operating an engine, comprising: advancing spark timing from a borderline spark timing toward minimum spark advance for best engine torque and enriching an engine air-fuel ratio in response to a catalyst temperature greater than a threshold temperature. The method further comprises reducing engine torque in response to the catalyst temperature and selection of a fuel economy mode. The method includes where the fuel economy mode is selected by a driver. The method includes where the fuel economy mode is selected in response to an amount of fuel stored in a fuel tank.

In one example, the method includes where engine torque is reduced to a torque where borderline spark timing is within a predetermined number of crankshaft degrees of minimum spark advance for best torque. The method includes where the predetermined number of crankshaft degrees is less than four degrees. The method further comprises retarding spark timing in response to an indication of engine knock.

In another example, the method of FIG. 4 provides for operating an engine, comprising: advancing spark timing from a borderline spark timing toward minimum spark advance for best engine torque and reducing engine torque to a predetermined engine torque in response to a catalyst temperature greater than a threshold temperature. The method includes where engine torque is reduced to an engine torque where minimum spark advance for best torque is provided without inducing engine knock. The method includes where the predetermined engine torque is a constrained engine torque.

The method of FIG. 4 further comprises limiting engine air flow to provide the constrained engine torque. The method further comprises enriching an engine air-fuel ratio in response to an accelerator pedal position being greater than a threshold accelerator pedal position. The method includes where the accelerator pedal position is greater than ninety percent of full pedal travel distance. The method further comprises limiting enriching the engine air-fuel ratio in response to engine speed and load.

In another example, the method of FIG. 4 provides for operating an engine, comprising: enriching an engine air-fuel ratio to a first air-fuel ratio and increasing engine torque in response to a catalyst temperature greater than a threshold catalyst temperature and an accelerator pedal position greater than a threshold accelerator pedal position during a first mode; and advancing spark timing toward minimum spark timing for best engine torque and enriching the engine air-fuel ratio to a second air-fuel ratio more lean than the first air-fuel ratio in response to the catalyst temperature being greater than the threshold catalyst temperature and an accelerator pedal position greater than the threshold accelerator pedal position during a second mode.

In another example, the method further comprises enriching the engine air-fuel ratio in response to vehicle acceleration greater than a threshold acceleration while the catalyst temperature is less than the threshold catalyst temperature. The method further comprises reducing engine torque during the second mode, and where the accelerator pedal position is increasing during the second mode. The method further comprises not constraining engine torque in the first mode and constraining engine torque in the second mode. The method includes where enriching the engine air-fuel ratio is proportionate to increasing accelerator pedal position. The method further comprises reducing engine torque in response to an indication of engine knock during the second mode.

As will be appreciated by one of ordinary skill in the art, method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:
   advancing spark timing from a borderline spark timing toward minimum spark advance for best engine torque and enriching an engine air-fuel ratio in response to a catalyst temperature greater than a threshold temperature; and
   reducing engine torque in response to the catalyst temperature greater than the threshold temperature and selection of a fuel economy mode.

2. The method of claim 1, where engine torque is reduced from a present engine torque to a nearest engine torque where the engine operates at minimum spark timing for best torque without engine knock.

3. The method of claim 1, where the fuel economy mode is selected by a driver, and further comprising reducing accelerator pedal based fuel enrichment when operating in the fuel economy mode as compared to accelerator pedal based fuel enrichment when not operating in the fuel economy mode.

4. The method of claim 1, where the fuel economy mode is selected in response to an amount of fuel stored in a fuel tank.

5. The method of claim 1, where engine torque is reduced to a torque where borderline spark timing is within a predetermined number of crankshaft degrees of minimum spark advance for best torque.

6. The method of claim 5, where the predetermined number of crankshaft degrees is less than four degrees.

7. The method of claim 1, further comprising retarding spark timing in response to an indication of engine knock.

8. A method for operating an engine, comprising:
   advancing spark timing from a borderline spark timing toward minimum spark advance for best engine torque and reducing engine torque to a predetermined engine torque in response to a catalyst temperature greater than a threshold temperature, where the predetermined engine torque is a constrained engine torque, and further comprising increasing torque of a motor to provide a driver demand torque via the engine and the motor.

9. The method of claim 8, where engine torque is reduced to an engine torque nearest a present engine torque where minimum spark advance for best torque is provided without inducing engine knock.

10. The method of claim 8, further comprising limiting engine air flow to provide the constrained engine torque.

11. The method of claim 8, further comprising enriching an engine air-fuel ratio in response to an accelerator pedal position being greater than a threshold accelerator pedal position.

12. The method of claim 11, where the accelerator pedal position is greater than ninety percent of full pedal travel distance.

13. The method of claim 12, further comprising limiting enriching the engine air-fuel ratio in response to engine speed and load, and further comprising advancing spark timing from the borderline spark timing toward minimum spark advance for best engine torque and reducing engine torque to the predetermined engine torque in response to a fuel economy mode selected without being selected by a driver in response to an amount of fuel stored in a fuel tank.

14. A method for operating an engine, comprising:
   enriching an engine air-fuel ratio to a first air-fuel ratio via adjusting fuel injection timing of a fuel injector and increasing engine torque in response to a catalyst temperature greater than a threshold catalyst temperature and an accelerator pedal position greater than a threshold accelerator pedal position during a first mode; and
   advancing spark timing toward minimum spark timing for best engine torque and enriching the engine air-fuel ratio via adjusting fuel injection timing of the fuel injector to a second air-fuel ratio more lean than the first air-fuel ratio in response to the catalyst temperature being greater than the threshold catalyst temperature and the accelerator pedal position greater than the threshold accelerator pedal position during a second mode, the second mode being a driver selected fuel economy mode.

15. The method of claim 14, further comprising enriching the engine air-fuel ratio in response to vehicle acceleration greater than a threshold acceleration while the catalyst temperature is less than the threshold catalyst temperature.

16. The method of claim 14, further comprising reducing engine torque during the second mode, and where the accelerator pedal position is increasing during the second mode.

17. The method of claim 14, further comprising not constraining engine torque in the first mode and constraining engine torque in the second mode.

18. The method of claim 14, where enriching the engine air-fuel ratio is proportionate to increasing accelerator pedal position.

19. The method of claim 14, further comprising reducing engine torque in response to an indication of engine knock during the second mode.

* * * * *